(12) United States Patent
Suzuki

(10) Patent No.: US 7,874,203 B2
(45) Date of Patent: Jan. 25, 2011

(54) MISFIRE DETECTION APPARATUS AND MISFIRE DETECTION METHOD FOR INTERNAL COMBUSTION ENGINE

(75) Inventor: Takashi Suzuki, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/548,511

(22) Filed: Aug. 27, 2009

(65) Prior Publication Data

US 2010/0050753 A1 Mar. 4, 2010

(30) Foreign Application Priority Data

Aug. 27, 2008 (JP) ............................. 2008-217926

(51) Int. Cl.
*G01M 15/04* (2006.01)

(52) U.S. Cl. .................................. 73/114.04; 73/114.02

(58) Field of Classification Search .............. 73/114.02, 73/114.04
See application file for complete search history.

(56) References Cited

U.S. PATENT DOCUMENTS

| | | | | |
|---|---|---|---|---|
| 5,728,941 A | * | 3/1998 | Yamamoto et al. ........ | 73/114.04 |
| 5,747,681 A | * | 5/1998 | Kuroda et al. ............ | 73/114.04 |
| 5,906,651 A | * | 5/1999 | Amano ....................... | 701/110 |
| 6,644,274 B2 | * | 11/2003 | Hasegawa et al. ....... | 123/406.41 |
| 7,448,360 B2 | * | 11/2008 | Kita ........................... | 123/436 |
| 7,503,207 B2 | * | 3/2009 | Nishigaki et al. ......... | 73/114.02 |

FOREIGN PATENT DOCUMENTS

| | | | |
|---|---|---|---|
| JP | 2001065402 A | 3/2001 | |
| JP | 2005307945 A | 11/2005 | |

* cited by examiner

*Primary Examiner*—Freddie Kirkland, III
(74) *Attorney, Agent, or Firm*—Gifford, Krass, Sprinkle, Anderson & Citkowski, P.C.

(57) ABSTRACT

In a misfire detection apparatus and method that detects a misfire in an internal combustion engine with cylinders provided in a vehicle, it is determined that a misfire occurs in the engine, if a first condition and a second condition are satisfied; the first condition is a condition that a rotational speed of an output shaft of the engine decreases by an amount equal to or larger than a first change amount during a time period from a compression top dead center in a first cylinder to the compression top dead center in a second cylinder; and the second condition is a condition that the rotational speed of the output shaft increases by an amount equal to or larger than a second change amount during a time period from the compression top dead center in the second cylinder to the compression top dead center in a third cylinder.

18 Claims, 8 Drawing Sheets

MISFIRE DETECTION APPARATUS AND MISFIRE DETECTION METHOD FOR INTERNAL COMBUSTION ENGINE

INCORPORATION BY REFERENCE

The disclosure of Japanese Patent Application No. 2008-217926 filed on Aug. 27, 2008 including the specification, drawings and abstract is incorporated herein by reference in its entirety.

BACKGROUND OF THE INVENTION

1. Field of the Invention

The invention relates to a misfire detection apparatus and a misfire detection method for an internal combustion engine.

2. Description of the Related Art

Recently, a hybrid vehicle has been widely used as an environmentally-friendly vehicle. In the hybrid vehicle, a direct-current power supply, an inverter, and a motor driven by the inverter are used as power sources, in addition to an internal combustion engine.

For example, Japanese Patent Application Publication No. 2001-65402 (JP-A-2001-65402) describes a control apparatus for a hybrid vehicle, which is a misfire detection apparatus for an internal combustion engine provided in such a hybrid vehicle. The control apparatus accurately detects a misfire even when a vibration suppression control is executed, and controls an engine so that the engine continues to appropriately operate. The control apparatus for a hybrid vehicle is applied to a hybrid vehicle that travels using at least one of the engine and a motor as a power source. When the engine operates, the control apparatus executes the vibration suppression control to suppress variation of torque of the engine using the motor or a generator connected to the output shaft of the engine. The control apparatus includes torque correction amount calculation means for calculating a torque correction amount for the motor or the generator, which is used to suppress the variation of the torque of the engine, when the vibration suppression control is executed; and misfire detection means for detecting a misfire in the engine based on the torque correction amount for the motor or the generator.

In the control apparatus for a hybrid vehicle described in the above publication, a misfire in the engine is detected based on the torque correction amount for the motor or the generator when the vibration suppression control is executed. Thus, it is possible to accurately detect a misfire, and to control the engine so that the engine continues to appropriately operate.

A transmission mechanism, which is provided between an internal combustion engine and drive wheels, may be provided with a damper that reduces torsion of a rotational shaft. In a hybrid vehicle that includes the damper, if a single misfire occurs in the internal combustion engine, the rotational speed of the rotational shaft of the internal combustion engine changes to a small extent, and thus, the accuracy of detecting a misfire decreases for the following reason. If a single misfire occurs in the internal combustion engine, the spring force of the damper resists a force that decreases the rotational speed of the rotational shaft of the internal combustion engine. This suppresses a decrease in the rotational speed of the rotational shaft of the internal combustion engine, thereby decreasing the accuracy of detecting the characteristic change in the rotational speed, which is caused by a misfire.

However, in the above-described publication, consideration is not given to the decrease in the accuracy of detecting a misfire. Thus, the accuracy of detecting a misfire needs to be improved.

SUMMARY OF THE INVENTION

The invention provides a misfire detection apparatus and a misfire detection method for an internal combustion engine, which improve the accuracy of detecting a misfire.

A first aspect of the invention relates to a misfire detection apparatus for an internal combustion engine, which detects a misfire in an internal combustion engine that is provided in a vehicle, and that includes a plurality of cylinders. The vehicle includes the internal combustion engine, a drive wheel, and a transmission mechanism that transmits torque output from the internal combustion engine to the drive wheel. The transmission mechanism includes a damper that reduces torsion of a component of the transmission mechanism, which is caused by the torque output from the internal combustion engine. Ignition is performed at a timing set based on a compression top dead center between a compression stroke and an expansion stroke, in each of the cylinders. The misfire detection apparatus includes a first detection portion that detects a rotational speed of an output shaft of the internal combustion engine; and a determination portion that determines whether a misfire occurs, based on an output of the first detection portion. The determination portion determines that a misfire occurs in the internal combustion engine, if a first condition and a second condition are satisfied. The first condition is a condition that the rotational speed of the output shaft decreases by an amount equal to or larger than a first change amount during a time period from the compression top dead center in a first cylinder among the plurality of cylinders, to the compression top dead center in a second cylinder in which the ignition is performed subsequently to the ignition in the first cylinder. The second condition is a condition that the rotational speed of the output shaft increases by an amount equal to or larger than a second change amount during a time period from the compression top dead center in the second cylinder, to the compression top dead center in a third cylinder in which the ignition is performed subsequently to the ignition in the second cylinder.

With the configuration, the transmission mechanism, which is provided between the internal combustion engine and the drive wheel, is provided with the damper that reduces the torsion of the rotational shaft. Therefore, if a single misfire occurs in the internal combustion engine, the rotational speed of the output shaft of the internal combustion engine decreases due to the misfire, and then, the rotational speed of the output shaft is accelerated by the spring force of the damper when combustion is performed in the cylinder in which the ignition is performed next. Thus, it is possible to determine whether there is a possibility that a misfire occurs, by determining whether the first condition is satisfied. Further, it is possible to determine whether the rotational speed of the output shaft of the internal combustion engine is accelerated by the spring force of the damper after a misfire occurs, by determining whether the second condition is satisfied. By performing these determinations, it is possible to accurately determine whether a misfire occurs in the internal combustion engine. Thus, it is possible to provide the misfire detection apparatus and the misfire detection method for an internal combustion engine, which improve the accuracy of detecting a misfire.

The misfire detection apparatus according to the above-described aspect may further include a second detection portion that detects a rotational speed of a drive wheel-side portion of a rotational shaft. The drive wheel-side portion is located closer to the drive wheel than the damper is. The determination portion may determine that a misfire occurs in the internal combustion engine, if a third condition is satisfied after the first condition and the second condition are satisfied; and the third condition may be a condition that the rotational speed of the drive wheel-side portion of the rotational shaft changes by a predetermined amount.

After a misfire occurs in the internal combustion engine, the rotational speed of the drive wheel-side portion of the rotational shaft, which is located closer to the drive wheel than the damper is, may change to a large extent due to the resonance of the damper. Therefore, with the above-described configuration, it is possible to more accurately determine whether a misfire occurs in the internal combustion engine, by determining whether the rotational speed of the drive wheel-side portion of the rotational shaft changes after the first condition and the second condition are satisfied.

In the above-described aspect, the determination portion may determine whether the third condition is satisfied after a set time, which is set according to a state of the internal combustion engine, elapses after the first condition and the second condition are satisfied.

After a misfire occurs in the internal combustion engine, the rotational speed of the drive wheel-side portion of the rotational shaft, which is located closer to the drive wheel than the damper is, may change to a large extent due to the resonance of the damper. Also, a time period from when a misfire occurs to when the rotational speed of the drive wheel-side portion of the rotational shaft changes may vary according to the state of the internal combustion engine. Therefore, with the above-described configuration, it is possible to more accurately determine whether a misfire occurs in the internal combustion engine, by determining whether the rotational speed of the rotational shaft changes after the set time, which is set according to the state of the internal combustion engine, elapses after the first condition and the second condition are satisfied.

In the above-described aspect, the vehicle may further include a first motor-generator and a second motor-generator; the transmission mechanism may further include a power split mechanism that transfers power between the internal combustion engine and the first and second motor-generators; and the damper may be provided between the internal combustion engine and the power split mechanism.

With the configuration, it is possible to accurately determine whether a misfire occurs, by applying the invention to the hybrid vehicle in which the damper is provided between the internal combustion engine and the power split mechanism.

In the above-described aspect, the transmission mechanism may include an automatic transmission with a lock-up clutch, in addition to the damper.

With the configuration, it is possible to accurately determine whether a misfire occurs, by applying the invention to the vehicle provided with the automatic transmission that includes the damper and the lock-up clutch.

In the above-described aspect, the transmission mechanism may include a manual transmission with a clutch mechanism, in addition to the damper.

With the configuration, it is possible to accurately determine whether a misfire occurs, by applying the invention to the vehicle provided with the manual transmission that includes the damper and the clutch mechanism.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
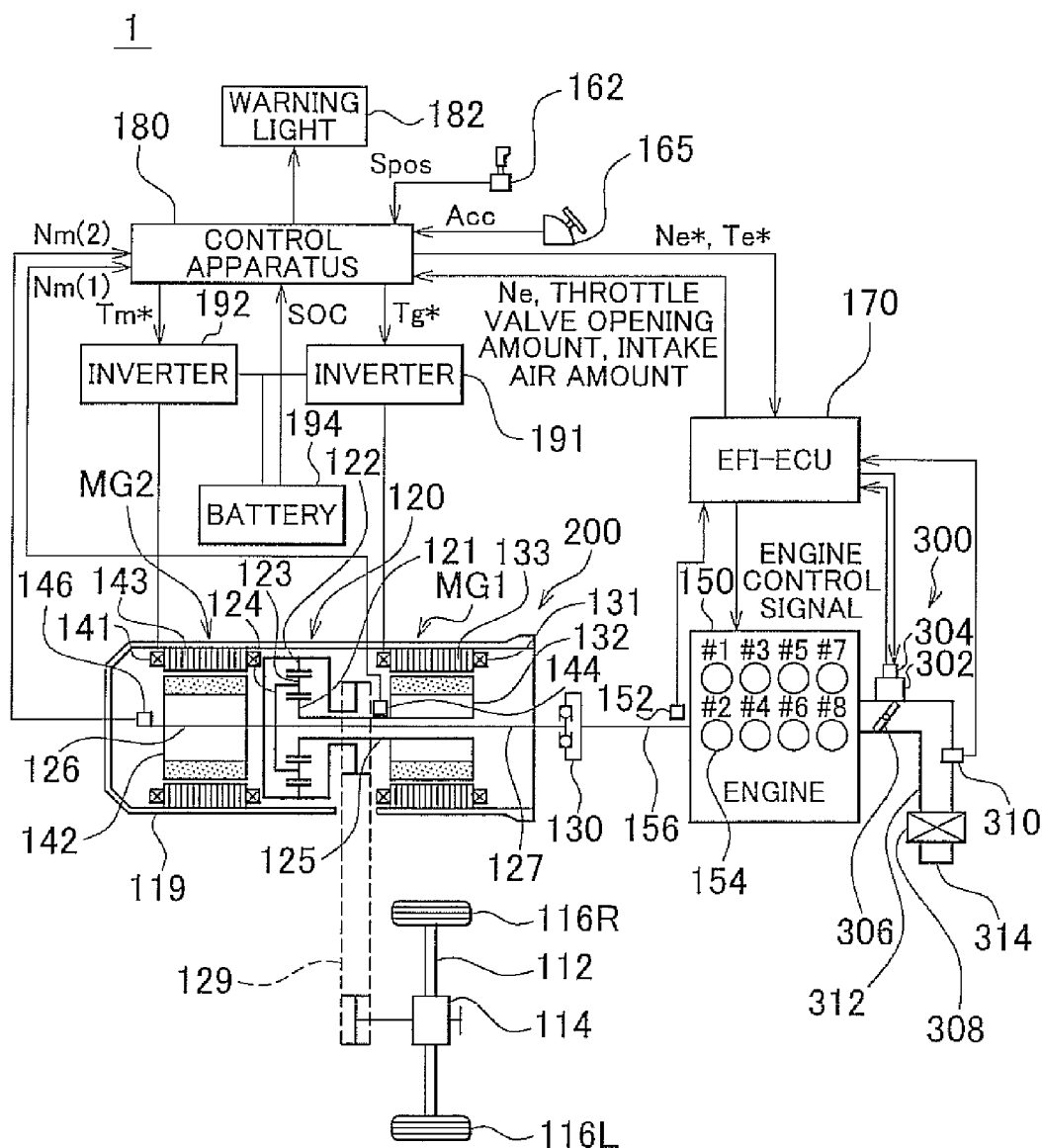
FIG. 1 shows a main configuration of a vehicle according to a first embodiment.

Hereinafter, embodiments of the invention will be described with reference to the drawings. In the following description, the same and corresponding components are denoted by the same reference numerals, and have the same names and the same functions. Therefore, the detailed description of the same and corresponding components will not be repeated.

First Embodiment

As shown in FIG. 1, a vehicle 1 includes an engine 150, a transmission 200, a control apparatus 180, an Electronic Fuel Injection—Electronic Control Unit (EFI—ECU) 170, inverters 191 and 192, and a battery 194.

In the embodiment, the vehicle 1 is a hybrid vehicle. However, the invention is not limited to a hybrid vehicle. The vehicle 1 is not particularly limited to a hybrid vehicle, as long as the vehicle includes a transmission mechanism that transmits torque output from the engine 150 to drive wheels 116R and 116L, and the transmission mechanism includes a damper that reduces torsion of a component of the transmission mechanism, which is caused by the torque output from the engine 150.

For example, the vehicle 1 may include an automatic transmission in which a lock-up clutch with a damper is provided, and the damper reduces the torsion of the component of the transmission mechanism, which is caused by the torque output from the engine 150. Also, the vehicle 1 may include a manual transmission in which a clutch mechanism with a damper is provided, and the damper reduces the torsion of the component of the transmission mechanism, which is caused by the torque output from the engine 150.

Also, the vehicle 1 may be a front-wheel drive vehicle or a rear-wheel drive vehicle. Alternatively, the vehicle 1 may be a four-wheel drive vehicle.

In the embodiment, the transmission 200 is the transmission mechanism that transmits the torque output from the engine 150 to the drive wheels 116R and 116L, and the transmission 200 includes a planetary gear 120 that is a power split mechanism, a damper 130, and motor-generators MG1 and MG2 that are power sources.

The planetary gear 120 is connected to the rotational shafts of the motor-generators MG1 and MG2 and the engine 150, and the drive shaft of the drive wheels 116R and 116L.

The engine 150 is an ordinary gasoline engine, and rotates a crankshaft 156. The engine 150 is provided with a crank position sensor 152 that detects the rotational speed of the crankshaft 156, and an intake air system 300. The crank position sensor 152 transmits a signal indicating the detected rotational speed of the crankshaft 156, to the EFI—ECU 170.

The engine 150 includes a plurality of cylinders 154. For example, the engine 150 is an eight-cylinder engine in the embodiment. However, the number of cylinders is not limited to a specific number.

The intake air system 300 includes an intake passage 312, an air cleaner 308, a throttle valve 306, a throttle motor 302, a throttle position sensor 304, and an airflow meter 310. Air taken in through an inlet 314 flows to the engine 150 through the intake passage 312. The air cleaner 308 captures dust, dirt, and the like contained in the air taken in through the inlet 314. The throttle valve 306 adjusts the flow amount of the air that flows through the intake passage 312. The throttle motor 302 changes the opening amount of the throttle valve 306 based on a throttle opening amount control signal transmitted from the EFI—ECU 170. The throttle position sensor 304 detects the opening amount of the throttle valve 306. The airflow meter detects the flow amount of the air that flows through the intake passage 312.

The throttle position sensor 304 transmits a signal indicating the detected opening amount of the throttle valve 306, to the EFI—ECU 170. The airflow meter 310 transmits a signal indicating the detected flow amount of air that flows through the intake passage 312 (hereinafter, the flow amount will be referred to as "intake air amount"), to the EFI—ECU 170.

The EFI—ECU 170 includes a one-chip microcomputer that includes a Central Processing Unit (CPU), a Read Only Memory (ROM), and a Random Access Memory (RAM). In the EFI—ECU 170, the CPU executes programs stored in the ROM, thereby transmitting an engine control signal to the engine 150 to execute a fuel injection control and the other controls for the engine 150.

The motor-generators MG1 and MG2 are synchronous motors. The motor-generators MG1 and MG2 include rotors 132 and 142, and stators 133 and 143, respectively. A plurality of permanent magnets are provided on the outer peripheral surface of each of the rotors 132 and 142. Three-phase coils 131 and 141 are wound around the stators 133 and 143, respectively. Each of the three-phase coils 131 and 141 generates a rotating magnetic field.

The stators 133 and 143 are fixed to a case 119. The three-phase coils 131 and 141, which are wound around the stators 133 and 143 of the motor-generators MG1 and MG2, respectively, are connected to a battery 194 via inverters 191 and 192, respectively.

Each of the inverters 191 and 192 is a transistor inverter in which a pair of transistors is provided for each phase, and the transistors function as switching elements. The inverter 191 and 192 are connected to the control apparatus 180. When the transistors of the inverters 191 and 192 are turned on according to the control signal from the control apparatus 180, electric current flows between the battery 194 and the motor-generators MG1 and MG2.

The motor-generators MG1 and MG2 may function as motors that are rotated by electric power supplied from the battery 194 (this traveling state may be referred to as "power running state"). When the rotors 132 and 142 are rotated by external force, the motor-generators MG1 and MG2 function as generators in which electromotive force is generated at ends of the three-phase coils 131 and 141, and thus, the motor-generators MG1 and MG2 charge the battery 194 (this traveling state may be referred to as "regenerative state").

The engine 150 is mechanically connected to the motor-generators MG1 and MG2 via a planetary gear 120. The planetary gear 120 includes a sun gear 121, a ring gear 122, a planetary pinion 123, a planetary carrier 124 that supports the planetary pinion 123.

The sun gear 121 is rotatable at the center of the planetary gear 120. The planetary pinion 123 engages with the outer periphery of the sun gear 121 and the inner periphery of the ring gear 122. The planetary pinion 123 rotates around its axis, and moves around the sun gear 121. The ring gear 122, which is located around the planetary pinion 123, is rotatable.

The crankshaft 156 of the engine 150 is connected to a planetary carrier shaft 127 via a damper 130. The damper 130 absorbs torsional vibration that occurs in the crankshaft 156. The rotor 132 of the motor-generator MG1 is connected to a sun gear shaft 125. The rotor 142 of the motor-generator MG2 is connected to a ring gear shaft 126. The rotation of the ring gear 122 is transmitted to a drive shaft 112 and the drive wheels 116R and 116L.

A reduction planetary gear or a gear mechanism that changes the rotational speed may be provided between the ring gear shaft 126 and the rotor 142 of the motor-generator MG2. Also, power may be transmitted via a gear mechanism, instead of the chain belt 129.

The control apparatus 180 controls the entire operation of the vehicle 1. The control apparatus 180 is one-chip microcomputer that includes a CPU, a ROM, and a RAM, as well as the EFI—ECU 170. The control apparatus 180 is connected to the EFI—ECU 170. Information is transmitted between the control apparatus 180 and the EFI—ECU 170.

For example, the control apparatus 180 obtains an engine rotational speed Ne detected by the crank position sensor 152, the throttle valve opening amount detected by the throttle position sensor 304, and the intake air amount detected by the airflow meter 310, via the EFI—ECU 170. Then, the control apparatus 180 transmits information required to control the engine 150, such as a torque command value Te*, an engine rotational speed command value Ne*, or a current vehicle state, to the EFI—ECU 170. Thus, the control apparatus 180 indirectly controls the operation of the engine 150. Also, the control apparatus 180 sets torque command values Tm* and Tg* to control the turning on/off of the inverters 191 and 192. Thus, the control apparatus 180 directly controls the operations of the motor-generators MG1 and MG2.

To execute the controls, the control apparatus 180 is connected to sensors such as an accelerator pedal position sensor 165, a first rotational speed sensor 144, a second rotational speed sensor 146, and a shift position sensor 162. The accelerator pedal position sensor 165 detects an accelerator pedal operation amount Acc that is the operation amount of an accelerator pedal depressed by a driver. The first rotational speed sensor 144 detects the rotational speed of the motor-generator MG1. The second rotational speed sensor 146 detects the rotational speed of the drive shaft 112 (the motor-generator MG2). The shift position sensor 162 is provided in a shift lever to detect a shifting instruction Spos. In addition, the control apparatus 180 is connected to, for example, a brake pedal position sensor (not shown) provided in a brake pedal.

The functions of the control apparatus 180 and the EFI—ECU 170 may be implemented by one computer. Also, the control apparatus 180 may include a plurality of ECUs (for example, a motor control ECU, a brake ECU, and a battery management ECU). A portion of the control apparatus, which is configured in the above-described manners, performs a misfire determination for the engine 150 as described below. The misfire determination may be performed in the control apparatus 180 or the EFI—ECU 170. That is, in the embodiment, the misfire determination is performed by calculating an amount of variation of the engine rotational speed, in the control apparatus 180. However, the misfire determination may be performed by calculating the amount of variation of the engine rotational speed, using the engine rotational speed, in the EFI—ECU 170.

The first rotational speed sensor 144 is provided in the sun gear shaft 125. The first rotational speed sensor 144 detects the rotational speed of the sun gear shaft 125, that is, the rotational speed Nm (1) of the motor-generator MG1. The first rotational speed sensor 144 transmits a signal indicating the rotational speed Nm (1) of the motor-generator MG1, to the control apparatus 180.

Because the ring gear shaft 126 is mechanically connected to the drive shaft 112, the second rotational speed sensor 146, which is used to detect the rotational speed of the drive shaft 112, is provided in the ring gear shaft 126, and the second rotational speed sensor 146 is also used to control the rotational speed Nm (2) of the motor-generator MG2, in the embodiment.

The control apparatus 180 receives a rotational angle θs of the sun gear shaft 125, a rotational angle θr of the ring gear shaft 126, current values Iu (1) and Iv (1) that are values of the electric current from the first inverter 191, current values Iu (2) and Iv (2) that are values of the electric current from the second inverter 192, and a state of charge SOC that indicates the remaining amount of charge in the battery 194. The control apparatus 180 executes a motor control and the like, using these values. Further, a warning light 182 is lit based on a warning light control signal from the control apparatus 180.

The engine 150 is an eight-cylinder engine. In the engine 150, ignition is performed in each cylinder when a piston (not shown) is positioned near a top dead center after an intake stroke and a compression stroke. After the ignition is performed, an expansion stroke and an exhaust stroke are performed. The engine 150 is thus operated.

Figure 2:
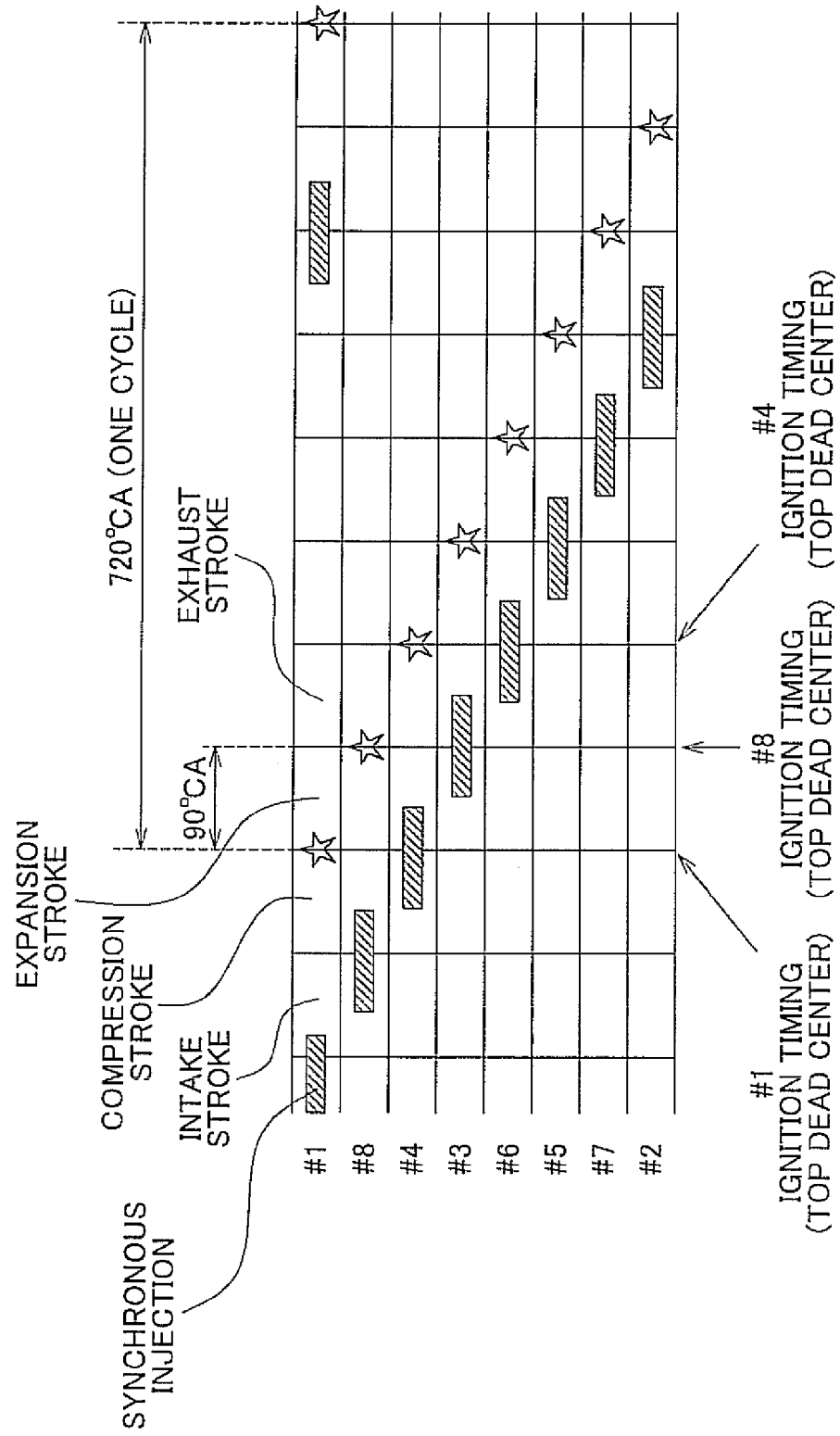
FIG. 2 shows an ignition order in an engine.

As shown in FIG. 2, the ignition is performed in the plurality of cylinders #1 to #8 in a predetermined order each time the crankshaft 156 rotates by 720° crank angle (CA). In the embodiment, the ignition is performed in the cylinders #1 to #8 in the predetermined order of #1, #8, #4, #3, #6, #5, #7, and #2. However, the predetermined order, in which the ignition is performed, is not limited to this order.

For example, the ignition is performed in the cylinder #1 at a timing set based on the compression top dead center between the compression stroke and the expansion stroke. Then, after the crankshaft 156 rotates by 90° CA from the compression top dead center, the ignition is performed at or near the compression top dead center in the cylinder #8. Then, after the crankshaft 156 further rotates by 90° CA, the ignition is performed at or near the compression top dead center in the cylinder #4. Then, the ignition is performed in the order of #3, #6, #5, #7, and #2 in a manner such that the ignition is performed at or near the compression top dead center in one of the cylinders #3, #6, #5, #7, and #2 each time the crankshaft 156 rotates by 90° CA.

In the embodiment, a time period in which the crankshaft 156 rotates by 720° CA is one cycle.

According to the embodiment of the invention, in the vehicle with the above-described configuration, the control apparatus 180 determines that a misfire occurs in the engine 150, if a first condition and a second condition are satisfied. The first condition is a condition that the engine rotational speed decreases by an amount equal to or larger than a first change amount during a time period from the compression top dead center in a first cylinder among the plurality of cylinders, to the compression top dead center in a second cylinder in which the ignition is performed subsequently to the ignition in the first cylinder. The second condition is a condition that the engine rotational speed increases by an amount equal to or larger than a second change amount during a time period from the compression top dead center in the second cylinder, to the compression dead center in a third cylinder in which the ignition is performed subsequently to the ignition in the second cylinder.

Figure 3:
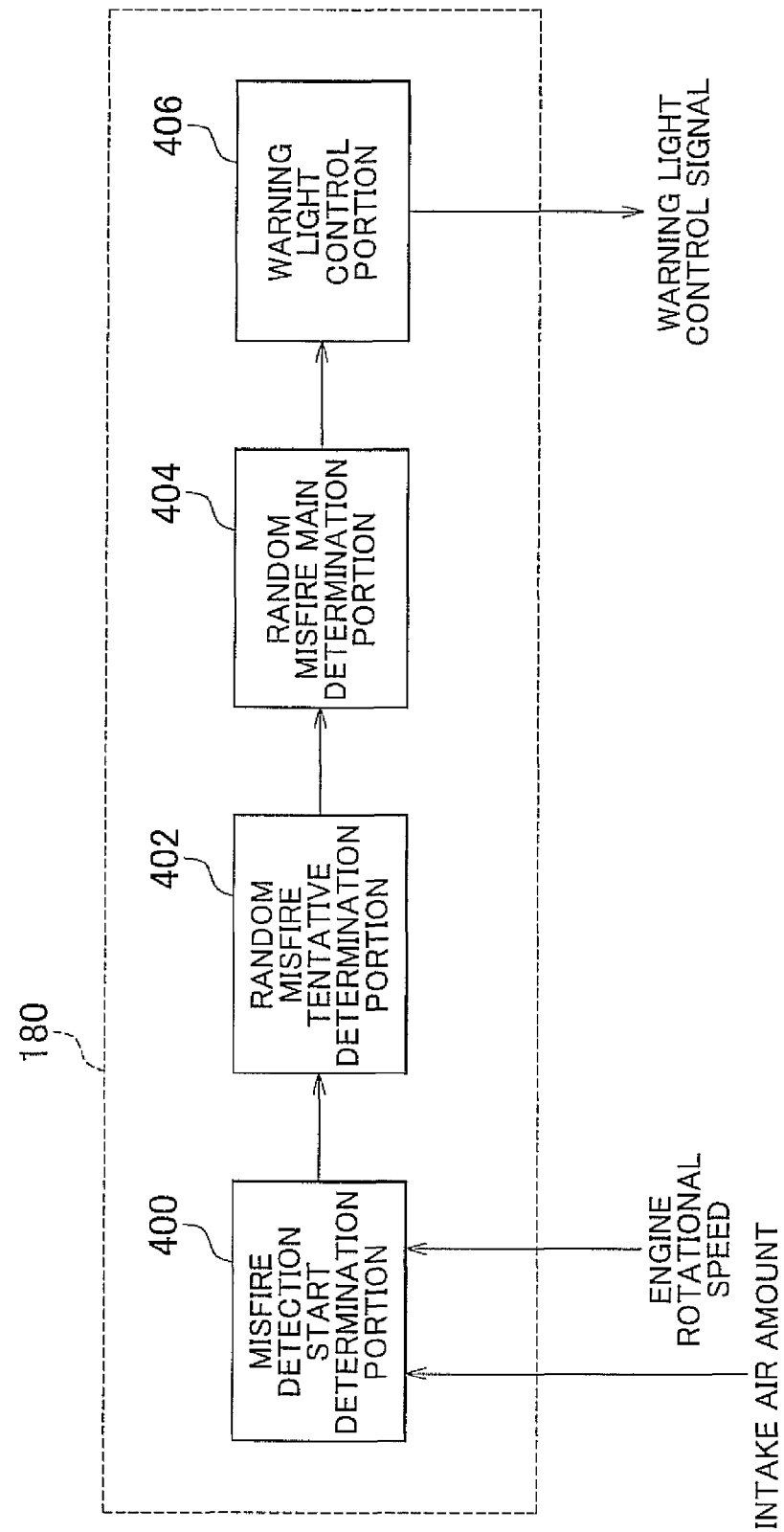
FIG. 3 is a functional block diagram showing a control apparatus that is a misfire detection apparatus for an internal combustion engine according to the first embodiment.

FIG. 3 is a functional block diagram showing the control apparatus 180 that is a misfire detection apparatus for an internal combustion engine according to the embodiment. The control apparatus 180 includes a misfire detection start determination portion 400, a random misfire tentative determination portion 402, a random misfire main determination portion 404, and a warning light control portion 406.

The misfire detection start determination portion 400 determines whether a predetermined condition for starting a misfire detection process when the engine 150 is operated (hereinafter, the predetermined condition will be referred to as "misfire detection start condition"). For example, the misfire detection start condition is a condition relating to the engine rotational speed Ne and an engine load factor.

More specifically, the misfire detection start condition is a condition that the current engine rotational speed Ne and the current engine load factor are in a predetermined operation region. For example, the misfire detection start determination portion 400 determines that the misfire detection start condition is satisfied, when the current engine rotational speed Ne and the current engine load factor are in the predetermined operation region. For example, the predetermined operation region is set to an operation region where a lower limit value of the engine load factor increases as the engine rotational speed increases. The predetermined operation region may be adjusted, for example, empirically. The misfire detection start determination portion 400 starts to determine whether the misfire detection start condition is satisfied, for example, at the end of the second rotation of the crankshaft 156 after the engine 150 is started.

The misfire detection start determination portion 400 calculates the engine load factor, for example, based on the intake air amount detected by the airflow meter 310. The misfire detection start determination portion 400 may calculate the engine load factor based on a pressure in an intake pipe, instead of the intake air amount.

Further, for example, the misfire detection start determination portion 400 may turn on a detection start determination flag, when the misfire detection start condition is satisfied.

The random misfire tentative determination portion 402 determines whether a random misfire tentative determination condition is satisfied, if the misfire detection start condition is satisfied. The random misfire tentative determination portion 402 determines whether the random misfire tentative determination condition is satisfied, based on a threshold value of the amount of variation of the rotational speed of the engine 150.

In the embodiment, the random misfire tentative determination portion 402 determines whether the random misfire tentative determination condition is satisfied, on the condition that the misfire detection start condition is satisfied. However, the invention is not limited to this configuration. The random misfire tentative determination portion 402 may determine whether the random misfire tentative determination condition is satisfied, regardless of whether the misfire detection start condition is satisfied. That is, the random misfire tentative determination portion 402 may determine whether the random misfire tentative determination condition is satisfied in all the operation regions of the engine 150.

For example, the random misfire tentative determination portion 402 measures a time required to change the rotational angle of the crankshaft 156 detected by the crank position sensor 152 by a predetermined angle, and determines a difference between the measured times. The random misfire tentative determination portion 402 determines the amount of variation of the engine rotational speed by monitoring the change in the difference. In the embodiment, the predetermined angle is, for example, 30° CA. In the following description, the time required to rotate the crankshaft 156 by 30° CA may be referred to as "time T30".

Figure 4:
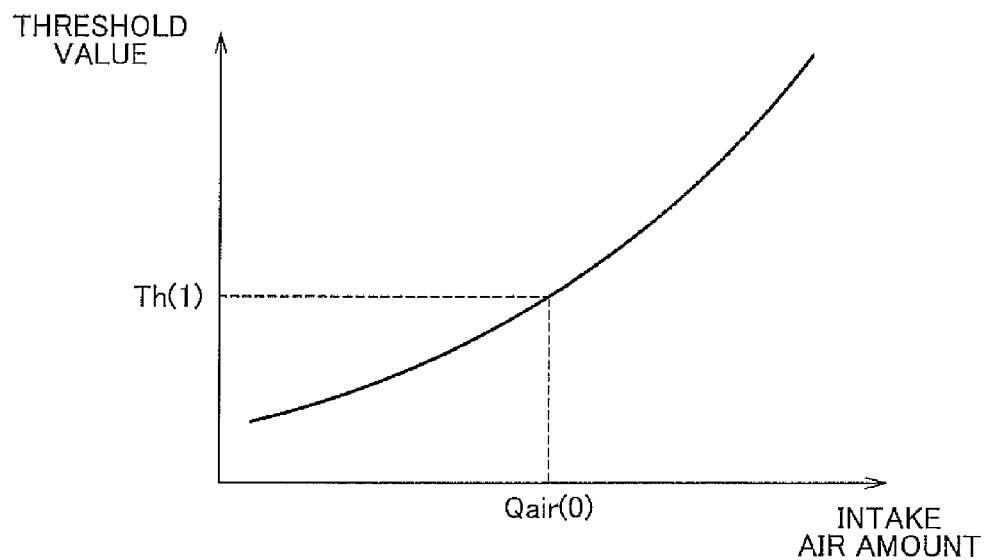
FIG. 4 shows a relation between an intake air amount and a threshold value Th (1)

For example, the random misfire tentative determination condition is a condition that the amount of variation of the rotational speed of the engine 150 is equal to or larger than a threshold value Th (1). The threshold value Th (1) may be increased as the load factor of the engine 150 increases, that is, the intake air amount increases. That is, for example, when the current intake air amount detected by the airflow meter 310 is equal to an intake air amount Qair (0), the random misfire tentative determination portion 402 may calculate the threshold value Th (1) using a map shown in FIG. 4.

Figure 5:
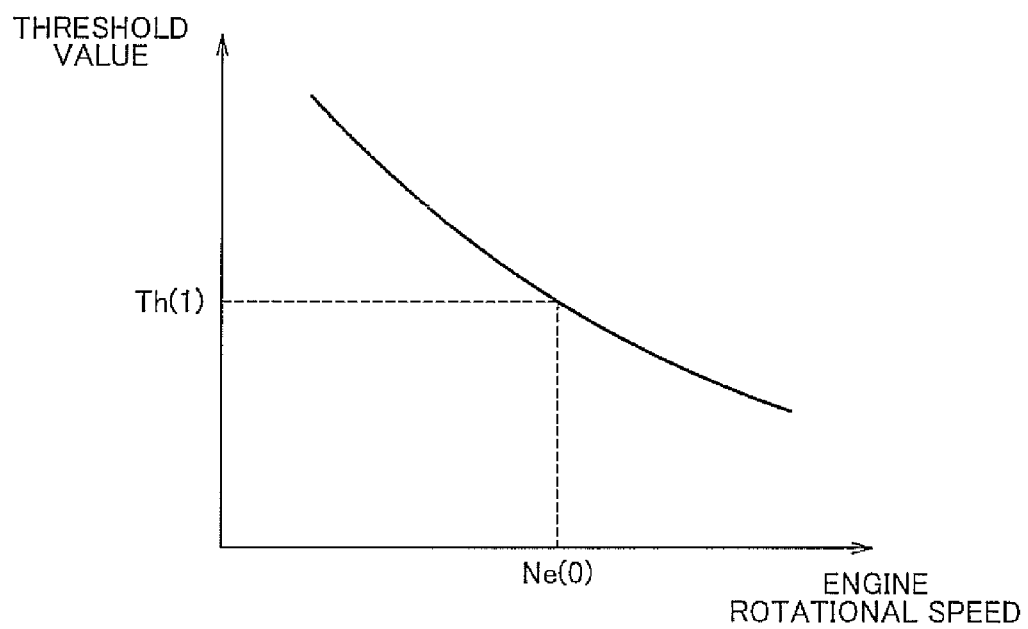
FIG. 5 shows a relation between an engine rotational speed and the threshold value Th (1)

Alternatively, the threshold value Th (1) may be set so that the threshold value Th (1) is decreased as the engine rotational speed Ne increases. That is, for example, when the current engine rotational speed detected by the crank position sensor 152 is equal to an engine rotational speed Ne (0), the random misfire tentative determination portion 402 may calculate the threshold value Th (1) using a map shown in FIG. 5.

Alternatively, the threshold value th (1) may be set based on the intake air amount for the engine 150 and the engine rotational speed Ne. That is, the threshold value Th (1) may be set so that the threshold value Th (1) is increased as the intake air amount for the engine 150 increases, and the threshold value Th (1) is decreased as the engine rotational speed increases.

Figure 6:
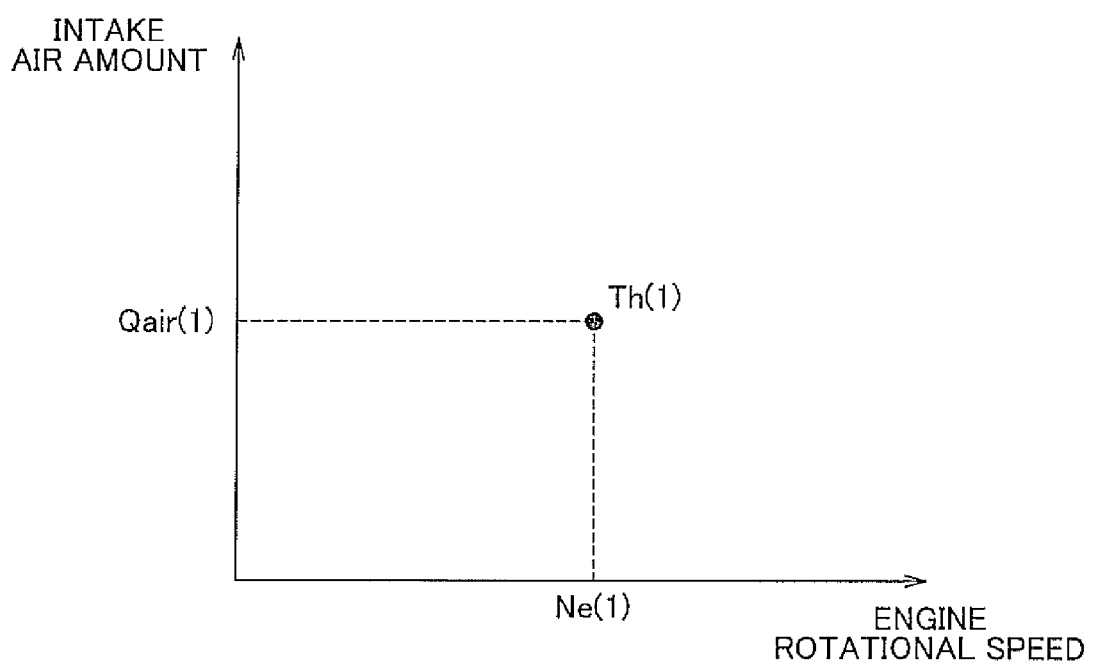
FIG. 6 shows a relation among the intake air amount, the engine rotational speed, and the threshold value Th (1)

For example, the random misfire tentative determination portion 402 may calculate the threshold value Th (1) based on a map showing the current intake air amount Qair (1), the current engine rotational speed Ne (1), and a relation among the engine rotational speed, the intake air amount, and the threshold value Th (1), as shown in FIG. 6. The map showing the relation among the engine rotational speed, the intake air amount, and the threshold value Th (1) may be adjusted, for example, empirically. In the map in FIG. 6, only the threshold value Th (1) corresponding to the intake air amount Qair (1) and the engine rotational speed Ne (1) is shown.

Alternatively, the random misfire tentative determination portion 402 may calculate a first correction value based on the intake air amount, may calculate a second correction value based on the engine rotational speed, and may set the threshold value Th (1) to a value obtained by adding the first correction value and the second correction value to the initial value of the threshold value Th (1).

The random misfire tentative determination portion 402 determines that the random misfire tentative determination condition is satisfied, if the amount of variation of the rotational speed of the engine 150 (i.e., the amount by which the time T30 changes) during the time period from the compression top dead center in the first cylinder to the compression top dead center in the second cylinder is equal to or larger than the threshold value Th (1). Also, the random misfire tentative determination portion 402 determines that the random misfire tentative determination condition is not satisfied, that is, the random misfire tentative determination portion 402 determines that a misfire does not occur, if the amount of variation of the rotational speed of the engine 150 is smaller than the threshold value Th (1).

The random misfire tentative determination portion 402 may determine whether the random misfire tentative determination condition is satisfied, for example, when the detection start determination flag is on. If the random misfire tentative determination condition is satisfied, the random misfire tentative determination portion 402 may turn on a random misfire tentative determination flag.

If the random misfire tentative determination condition is satisfied, the random misfire main determination portion 404 determines whether a random misfire main determination condition is satisfied. The random misfire main determination condition is a condition that the engine rotational speed Ne decreases by an amount equal to or larger than the first change amount during the time period from the compression top dead center in the first cylinder among the plurality of cylinders, to the compression top dead center in the second cylinder in which the ignition is performed subsequently to the ignition in the first cylinder, and the engine rotational speed Ne increases by an amount equal to or larger than the second change amount during the time period from the compression top dead center in the second cylinder, to the compression top dead center in the third cylinder in which the ignition is performed subsequently to the ignition in the second cylinder.

In the embodiment, the random misfire main determination portion 404 determines that a first condition, which is a condition that that the engine rotational speed decreases by an amount equal to or larger than the first change amount, is satisfied, if the time T30 at the compression top dead center in the second cylinder is longer than the time T30 at the compression top dead center in the first cylinder by an amount equal to or larger than a threshold value Th (2).

Further, the random misfire main determination portion 404 determines that a second condition, which is a condition that the engine rotational speed increases by an amount equal to or larger than the second change amount, is satisfied, if the time T30 at the compression top dead center in the third cylinder is shorter than the time T30 at the compression top dead center in the second cylinder by an amount equal to or larger than a threshold value Th (3).

The random misfire main determination portion 404 determines that the random misfire main determination condition is satisfied, if the engine rotational speed decreases by an amount equal to or larger than the first change amount during the time period from the compression top dead center in the first cylinder, to the compression top dead center in the second cylinder, and the engine rotational speed increases by an amount equal to or larger than the second change amount during the time period from the compression top dead center in the second cylinder, to the compression top dead center in the third cylinder.

The threshold value Th (2) may be equal to the threshold value Th (1), or may be different from the threshold value Th (1). The threshold value Th (2) needs to satisfy at least a requirement that the threshold value Th (2) corresponds to the amount of variation of the rotational speed of the engine 150 when a single misfire occurs in the engine 150. The threshold value Th (2) is adjusted, for example, empirically.

The threshold value Th (3) needs to correspond to the amount of variation of the rotational speed of the engine 150 in the case where the spring force of the damper 130 accelerates the rotation of the crankshaft 156 when combustion is performed in the second cylinder. The threshold value Th (3) is adjusted, for example, empirically.

The threshold values Th (2) and Th (3) may be set according to the engine rotational speed, according to the intake air amount, or according to the engine rotational speed and the intake air amount, as well as the threshold value Th (1).

The random misfire main determination portion 404 may determine whether the random misfire main determination condition is satisfied, for example, when the random misfire tentative determination flag is on. If the random misfire main determination portion 404 determines that the random misfire main determination condition is satisfied, the random misfire main determination portion 404 may turn on a random misfire main determination flag. If the random misfire main determination portion 404 determines that the random misfire main determination condition is not satisfied, the random misfire main determination portion 404 may turn off the random misfire main determination flag.

If the random misfire main determination portion 404 determines that the random misfire main determination condition is satisfied, the warning light control portion 406 generates the warning light control signal, and transmits the warning light control signal to the warning light 182 so that the warning light 182 indicates that a misfire occurs. The warning light control portion 406 may transmit the warning light control signal to the warning light 182, when the random misfire main determination flag is turned on.

In the embodiment, each of the misfire detection start determination portion 400, the random misfire tentative determination portion 402, the random misfire main determination portion 404, and the warning light control portion 406 is realized when the CPU of the control apparatus 180 executes a program that is stored in the memory. In the embodiment, each of the misfire detection start determination portion 400, the random misfire tentative determination portion 402, the random misfire main determination portion 404, and the warning light control portion 406 functions as software. However, each of the misfire detection start determination portion 400, the random misfire tentative determination portion 402, the random misfire main determination portion 404, and the warning light control portion 406 may be realized by hardware. The programs are stored in the storage medium, and provided in the vehicle.

Figure 7:
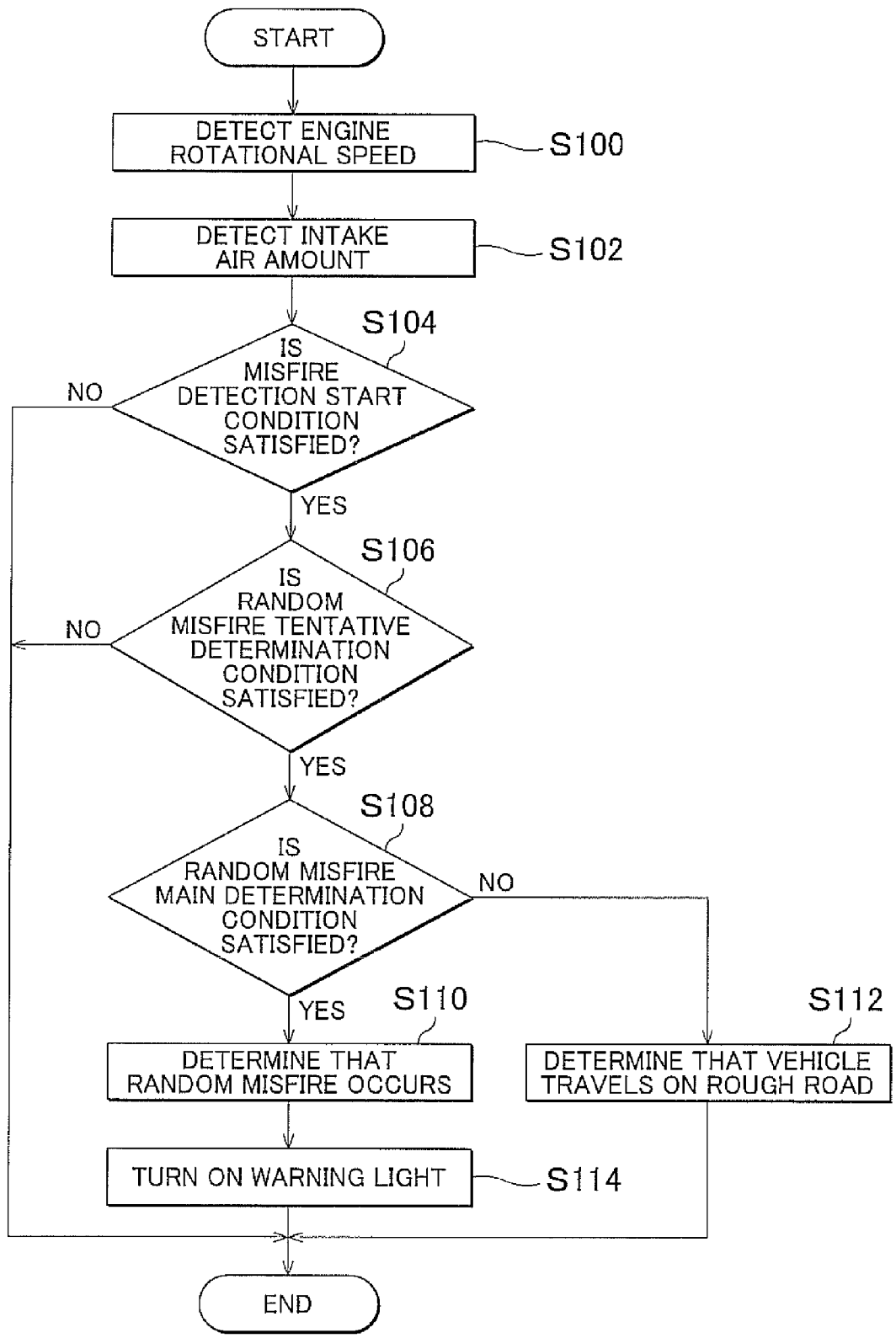
FIG. 7 is a flowchart of a program executed by the control apparatus that is the misfire detection apparatus for an internal combustion engine according to the first embodiment.

The control structure of a program executed by the control apparatus 180, which is the misfire detection apparatus for an internal combustion engine according to the embodiment, will be described with reference to FIG. 7.

In step S100, the control apparatus 180 detects the engine rotational speed Ne. In step S102, the control apparatus 180 detects the intake air amount.

In step S104, the control apparatus 180 determines whether the misfire detection start condition is satisfied. If the misfire detection start condition is satisfied (YES in step S104), the routine proceeds to step S106. If the misfire detection start condition is not satisfied (NO in step S104), the routine ends.

In step S106, the control apparatus 180 determines whether the random misfire tentative determination condition is satisfied. If the random misfire tentative determination condition is satisfied (YES in step S106), the routine proceeds to step S108. If the random misfire tentative determination condition is not satisfied (NO in step S106), the routine ends.

In step S108, the control apparatus 180 determines whether the random misfire main determination condition is satisfied. If the random misfire main determination condition is satisfied (YES in step S108), the routine proceeds to step S110. If the random misfire main determination condition is not satisfied (NO in step S180), the routine proceeds to step S112.

In step S110, the control apparatus 180 determines that a random misfire occurs. In step S112, the control apparatus 180 determines that the engine rotational speed changes because the vehicle travels on a rough road. In step S114, the control apparatus 180 turns on the warning light 182.

Figure 8:
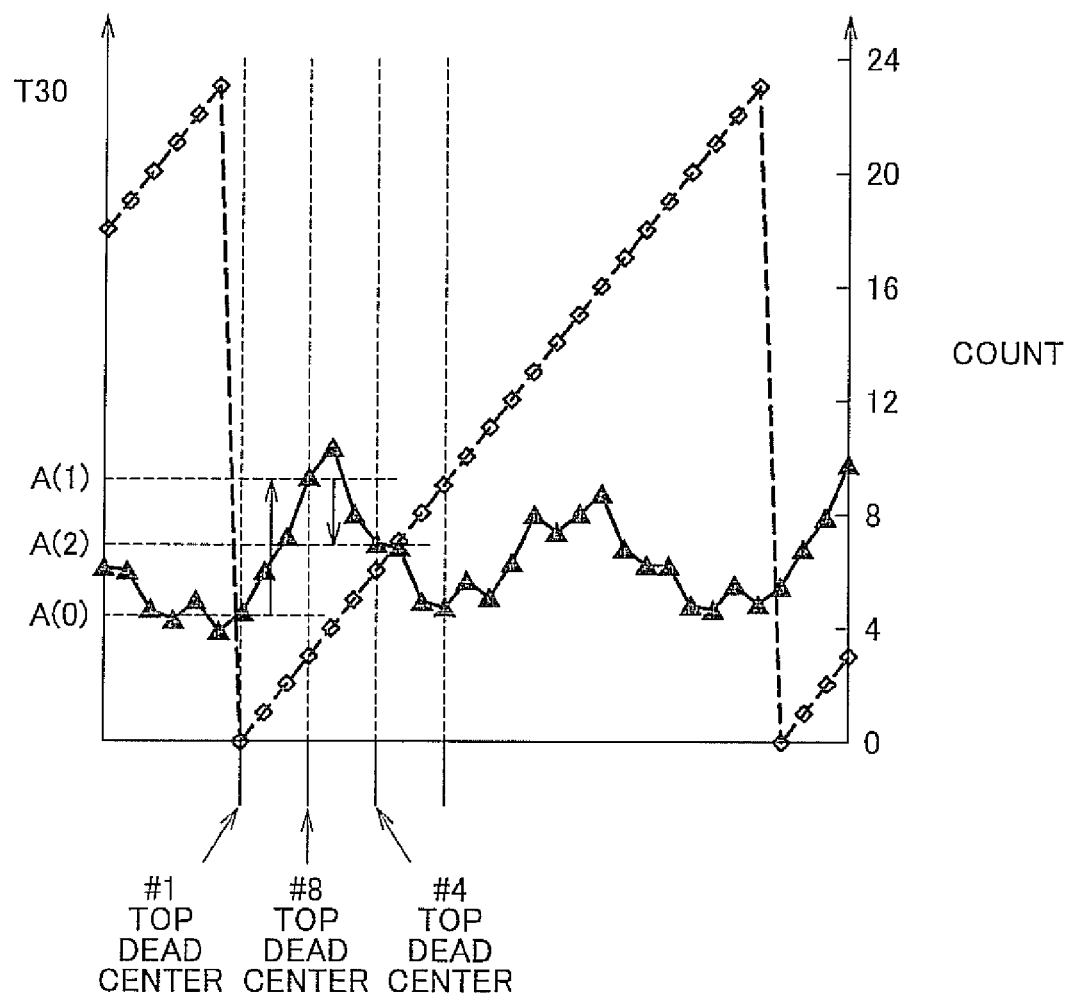
FIG. 8 is a timing chart showing operation of the control apparatus that is the misfire detection apparatus for an internal combustion engine according to the first embodiment.

The operation of the control apparatus 180, which is the misfire detection apparatus for an internal combustion engine according to the first embodiment, will be described with reference to FIG. 8. The control apparatus 180 has the above-described configuration, and operates based on the above-described flowchart. In the following description, the cylinder #1 corresponds to the first cylinder, the cylinder #8 corresponds to the second cylinder, and the cylinder #4 corresponds to the third cylinder. However, the first, second, and third cylinders are not limited to the cylinder #1, #8, and #4, respectively. In FIG. 8, the abscissa axis indicates the rotational angle of the crankshaft 156. The ordinate axis in the left side of FIG. 8 indicates the value of the time T30, and relates to a change in the solid line in FIG. 8. In the ordinate axis in the right side of FIG. 8 indicates the value of a count that increases by one each time the crankshaft 156 rotates by 30° CA, and relates to a change in the dashed line in FIG. 8. The time T30 is calculated each time the count increases by one.

When the engine rotational speed Ne is detected (S100), and the intake air amount is detected (S102), it is determined whether the misfire detection start condition is satisfied (S104). If it is determined that the misfire detection start condition is satisfied based on the detected engine rotational speed Ne and the detected intake air amount (YES in step S104), it is determined whether the random misfire tentative determination condition is satisfied (S106).

As shown in FIG. 8, in the case where the value of the time T30 at the top dead center in the cylinder #1 is A (0), and the value of the time T30 at the top dead center in the cylinder #8, in which the ignition is performed subsequently to the ignition in the cylinder #1, is A (1), if a value obtained by subtracting the value A (0) from the value A (1) (i.e., A (1)−A (0)) is equal to or larger than the threshold value Th (1), it is determined that the random misfire tentative determination condition is satisfied (YES in step S106). Then, it is determined whether the random misfire main determination condition is satisfied (S108).

As shown in FIG. 8, in the case where the value of the time T30 at the top dead center in the cylinder #1 is A (0), the value of the time T30 at the top dead center in the cylinder #8, in which the ignition is performed subsequently to the ignition in the cylinder #1, is A (1), and the value of the time T30 at the top dead center in the cylinder #4, in which the ignition is performed subsequently to the ignition in the cylinder #8, is A (2), if a value obtained by subtracting the value A (0) from the value A (1) (i.e., A (1)−A (0)) is equal to or larger than the threshold value Th (2), and a value obtained by subtracting the value A (2) from the value A (1) (i.e., A (1)−A (2)) is equal to or larger than the threshold value Th (3), it is determined that the random misfire main determination condition is satisfied (YES in step S108). If it is determined that a random misfire occurs (S110), the warning light 182 is lit (S114). If it is determined that the random misfire main determination condition is not satisfied (NO in step S108), it is determined that the vehicle travels on a rough road (S112).

As described above, in the misfire detection apparatus for an internal combustion engine according to the embodiment, the damper that reduces torsion of the rotational shaft is provided in the transmission provided between the engine and the drive wheels. Therefore, if a single misfire occurs in the engine, the engine rotational speed decreases due to the misfire. Then, when combustion is performed in the cylinder in which the ignition is performed next, the spring force of the damper is applied to accelerate the engine rotational speed.

Accordingly, it is possible to determine whether there is a possibility that a misfire occurs, by determining whether the engine rotational speed decreases by an amount equal to or larger than the first change amount during the time period from the compression top dead center in the first cylinder, to the compression top dead center in the second cylinder. Further, it is possible to determine whether the engine rotational speed is accelerated by the spring force of the damper after a misfire occurs, by determining whether the engine rotational speed increases by an amount equal to or larger than the second change amount during the time period from the compression top dead center in the second cylinder, to the compression top dead center in the third cylinder. By performing these determinations, it is possible to accurately determine whether a misfire occurs in the engine. Thus, it is possible to provide the misfire detection apparatus and the misfire detection method for an internal combustion engine, which improve the accuracy of detecting a misfire.

Second Embodiment

Hereinafter, a misfire detection apparatus for an internal combustion engine according to a second embodiment will be described. The configuration of the misfire detection apparatus for an internal combustion engine according to the second embodiment is the same as the configuration of the misfire detection apparatus for an internal combustion engine according to the first embodiment, except for the random misfire main determination condition. The same components as those in the first embodiment are denoted by the same reference numerals, and have the same functions as in the first embodiment, and therefore, the detailed description thereof will be omitted.

In the second embodiment, the random misfire main determination condition includes a third condition, in addition to the first condition and the second condition described in the first embodiment. The third condition is a condition that the rotational speed of a drive wheel-side portion of the rotational shaft, which is located closer to the drive wheels 116R and 116L than the damper 130 is, changes by a predetermined value, after the first condition and the second condition are satisfied.

In the embodiment, "the rotational speed of the drive-wheel side portion of the rotational shaft" is the rotational speed of the planetary carrier shaft 127. However, "the rotational speed of the drive wheel-side portion of the rotational shaft" is not limited to the rotational speed of the planetary carrier shaft 127.

The control apparatus 180 calculates the rotational speed of the planetary carrier shaft 127 based on the rotational speed Nm (1) of the motor-generator MG1, the rotational speed Nm (2) of the motor-generator MG2, and the gear ratio of the planetary gear 120 that is the power split mechanism. A rotational speed sensor may be disposed directly on the planetary carrier shaft 127 to detect the rotational speed of the planetary carrier shaft 127.

If the random misfire main determination portion 404 determines that the first condition and the second condition are satisfied, the random misfire main determination portion 404 calculates a change amount by which the rotational speed of the planetary carrier shaft 127 changes during a predetermined time period after a set time, which is set according to the state of the engine 150, elapses after it is determined that the first and second conditions are satisfied, and determines whether the third condition, which is a condition that the calculated change amount is equal to or larger than the predetermined value, is satisfied. If the calculated change amount is equal to or larger than the predetermined value, the random misfire main determination portion 404 determines that the third condition is satisfied, and determines that a misfire occurs in the engine 150.

The set time, which is set according to the state of the engine 150, is set according to a time from a time point at which a misfire occurs, to a time point at which the rotational speed of the drive wheel-side portion of the rotational shaft is estimated to change due to resonance of the damper 130. For example, the set time, which is set according to the state of the engine 150, is set according to the engine rotational speed. The set time is adjusted, for example, empirically. The set time, which is set according to the state of the engine 150, may be a predetermined time. Also, the predetermined time period used to calculate the change amount, by which the rotational speed of the planetary carrier shaft 127 changes, is adjusted, for example, empirically.

A flowchart showing the control structure of the program executed by the control apparatus 180, which is the misfire detection apparatus for an internal combustion engine according to the second embodiment, is the same as the flowchart shown in FIG. 3. Accordingly, the detailed description of the flowchart will be omitted.

Figure 9:
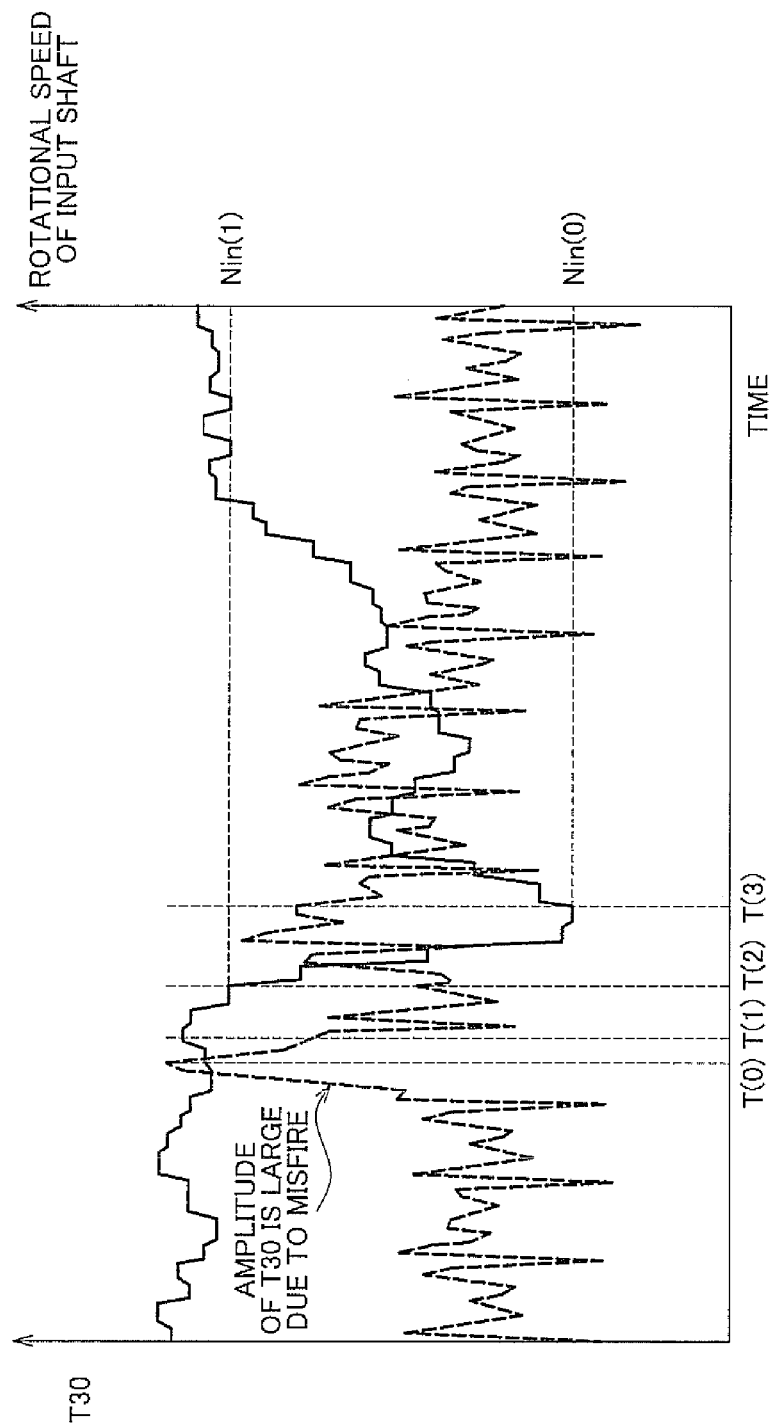
FIG. 9 is a timing chart showing operation of a control apparatus that is a misfire detection apparatus for an internal combustion engine according to a second embodiment.

The operation of the control apparatus 180, which is the misfire detection apparatus for an internal combustion engine according to the second embodiment, will be described with reference to FIG. 9. The control apparatus 180 has the above-described configuration, and operates based on the above-described flowchart. In FIG. 9, the abscissa axis indicates time. The ordinate axis in the left side of FIG. 9 indicates the value of the time T30, and relates to a change in the dashed line. The ordinate axis in the right side of FIG. 9 indicates the rotational speed of the input shaft, that is, the rotational speed of the planetary carrier shaft 127, and relates to a change in the solid line in FIG. 9.

When the engine rotational speed Ne is detected (S100), and the intake air amount is detected (S102), it is determined whether the misfire detection start condition is satisfied (S104). If it is determined that the misfire detection start condition is satisfied based on the detected engine rotational speed Ne and the detected intake air amount (YES in step S104), it is determined whether the random misfire tentative determination condition is satisfied (S106).

That is, as shown by the dashed line in FIG. 9, in the case where the value of the time T30 at the top dead center in the cylinder #1 is A (0), and the value of the time T30 at the top dead center in the cylinder #8, in which the ignition is performed subsequently to the ignition in the cylinder #1, is A (1), if a value obtained by subtracting the value A (0) from the value A (1) (i.e., A (1)−A (0)) is equal to or larger than the threshold value Th (1), it is determined that the random misfire tentative determination condition is satisfied (YES in step S106) at a time point T (0). Then, it is determined whether the random misfire main determination condition is satisfied (S108).

In the case where the value of the time T30 at the top dead center in the cylinder #1 is A (0), the value of the time T30 at the top dead center in the cylinder #8, in which the ignition is performed subsequently to the ignition in the cylinder #1, is A (1), and the value of the time T30 at the top dead center in the cylinder #4, in which the ignition is performed subsequently to the ignition in the cylinder #8, is A (2), if a value obtained by subtracting the value A (0) from the value A (1) (i.e., A (1)−A (0)) is equal to or larger than the threshold value Th (2), and a value obtained by subtracting the value A (2) from the value A (1) (i.e., A (1)−A (2)) is equal to or larger than the threshold value Th (3), the first and second conditions are satisfied at a time point T (1). If the change amount (Nin (1)−Nin (0)), by which the rotational speed of the planetary carrier shaft 127 changes during the predetermined time period after the set time elapses after it is determined that the first and second conditions are satisfied, that is, during the time period from a time point T (2) to a time point T (3), is equal to or larger than the predetermined value, it is determined that the random misfire main determination condition is satisfied (YES in step S108). If it is determined that a random misfire occurs (S110), the warning light 182 is lit (S116). If it is determined that the random misfire main determination condition is not satisfied (NO in step S108), it is determined that the vehicle travels on a rough road (S112).

As described above, in the misfire detection apparatus for an internal combustion engine according to the second embodiment, it is possible to obtain the following advantageous effects, in addition to the advantageous effects obtained in the misfire detection apparatus for an internal combustion engine according to the first embodiment. After a misfire occurs in the engine, the rotational speed of the drive wheel-side of the rotational shaft, which is located closer to the drive wheels than the damper is, changes to a large extent due to resonance of the damper. Therefore, it is possible to more accurately determine whether a misfire occurs in the engine, by determining whether the rotational speed of the rotational shaft changes after the first and second conditions are satisfied.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A misfire detection apparatus for an internal combustion engine, which detects a misfire in an internal combustion engine that is provided in a vehicle, and that includes a plurality of cylinders, wherein the vehicle includes the internal combustion engine, a drive wheel, and a transmission mechanism that transmits torque output from the internal combustion engine to the drive wheel; the transmission mechanism includes a damper that reduces torsion of a component of the transmission mechanism, which is caused by the torque output from the internal combustion engine; and ignition is performed at a timing set based on a compression top dead center between a compression stroke and an expansion stroke, in each of the cylinders, the misfire detection apparatus comprising:

a first detection portion that detects a rotational speed of an output shaft of the internal combustion engine; and a determination portion that determines whether a misfire occurs, based on an output of the first detection portion, wherein the determination portion determines that a misfire occurs in the internal combustion engine, if a first condition and a second condition are satisfied;

the first condition is a condition that the rotational speed of the output shaft decreases by an amount equal to or larger than a first change amount during a time period from the compression top dead center in a first cylinder among the plurality of cylinders, to the compression top dead center in a second cylinder in which the ignition is performed subsequently to the ignition in the first cylinder; and the second condition is a condition that the rotational speed of the output shaft increases by an amount equal to or larger than a second change amount during a time period from the compression top dead center in the second cylinder, to the compression top dead center in a third cylinder in which the ignition is performed subsequently to the ignition in the second cylinder.

2. The misfire detection apparatus according to claim 1, further comprising a second detection portion that detects a rotational speed of a drive wheel-side portion of a rotational shaft, the drive wheel-side portion being located closer to the drive wheel than the damper is, wherein the determination portion determines that a misfire occurs in the internal combustion engine, if a third condition is satisfied after the first condition and the second condition are satisfied; and the third condition is a condition that the rotational speed of the drive wheel-side portion of the rotational shaft changes by a predetermined amount.

3. The misfire detection apparatus according to claim 2, wherein the determination portion determines whether the third condition is satisfied after a set time, which is set according to a state of the internal combustion engine, elapses after the first condition and the second condition are satisfied.

4. The misfire detection apparatus according to claim 3, wherein the determination portion determines whether the third condition is satisfied during a predetermined period after the set time, which is set according to the state of the internal combustion engine, elapses after the first condition and the second condition are satisfied.

5. The misfire detection apparatus according to claim 1, wherein the vehicle further includes a first motor-generator and a second motor-generator;

the transmission mechanism further includes a power split mechanism that transfers power between the internal combustion engine and the first and second motor-generators; and the damper is provided between the internal combustion engine and the power split mechanism.

6. The misfire detection apparatus according to claim 1, wherein the transmission mechanism includes an automatic transmission with a lock-up clutch, in addition to the damper.

7. The misfire detection apparatus according to claim 1, wherein the transmission mechanism includes a manual transmission with a clutch mechanism, in addition to the damper.

8. The misfire detection apparatus according to claim 1, wherein the determination portion determines whether a tentative determination condition is satisfied;

the tentative determination condition is a condition that an amount of variation of the rotational speed of the output shaft during the time period from the compression top dead center in the first cylinder to the compression top dead center in the second cylinder is equal to or larger than a threshold value; and if the tentative determination condition is satisfied, the determination portion determines whether the first condition and the second condition are satisfied.

9. The misfire detection apparatus according to claim 8, wherein the determination portion determines whether a misfire detection start condition is satisfied;

the misfire detection start condition is a condition that the current rotational speed of the output shaft and a current engine load factor are in a predetermined operation region;

if the misfire detection start condition is satisfied, the determination portion determines whether the tentative determination condition is satisfied; and the predetermined operation region is set to an operation region where a lower limit value of the engine load factor increases as the rotational speed of the output shaft increases.

10. A misfire detection method for an internal combustion engine, which detects a misfire in an internal combustion engine that is provided in a vehicle, and that includes a plurality of cylinders, wherein the vehicle includes the internal combustion engine, a drive wheel, and a transmission mechanism that transmits torque output from the internal combustion engine to the drive wheel; the transmission mechanism includes a damper that reduces torsion of a component of the transmission mechanism, which is caused by the torque output from the internal combustion engine; and ignition is performed at a timing set based on a compression top dead center between a compression stroke and an expansion stroke, in each of the cylinders, the misfire detection method comprising:

detecting a rotational speed of an output shaft of the internal combustion engine;

determining whether a misfire occurs, based on the detected rotational speed of the output shaft, wherein in determining whether a misfire occurs, it is determined that a misfire occurs in the internal combustion engine, if a first condition and a second condition are satisfied;

the first condition is a condition that the rotational speed of the output shaft decreases by an amount equal to or larger than a first change amount during a time period from the compression top dead center in a first cylinder among the plurality of cylinders, to the compression top dead center in a second cylinder in which the ignition is performed subsequently to the ignition in the first cylinder; and the second condition is a condition that the rotational speed of the output shaft increases by an amount equal to or larger than a second change amount during a time period from the compression top dead center in the second cylinder to the compression top dead center in a third cylinder in which the ignition is performed subsequently to the ignition in the second cylinder.

11. The misfire detection method according to claim 10, further comprising detecting a rotational speed of a drive wheel-side portion of a rotational shaft, the drive-wheel-side portion being located closer to the drive wheel than the damper is, wherein in determining whether a misfire occurs, it is determined that a misfire occurs in the internal combustion engine, if a third condition is satisfied after the first condition and the second condition are satisfied; and the third condition is a condition that the rotational speed of the drive wheel-side portion of the rotational shaft changes by a predetermined amount.

12. The misfire detection method according to claim 11, wherein in determining whether a misfire occurs, it is determined whether the third condition is satisfied after a set time, which is set according to a state of the internal combustion engine, elapses after the first condition and the second condition are satisfied.

13. The misfire detection method according to claim 12, wherein in determining whether a misfire occurs, it is determined whether the third condition is satisfied during a predetermined period after the set time, which is set according to the state of the internal combustion engine, elapses after the first condition and the second condition are satisfied.

14. The misfire detection method according to claim 10, wherein the vehicle further includes a first motor-generator and a second motor-generator;

the transmission mechanism further includes a power split mechanism that transfers power between the internal combustion engine and the first and second motor-generators; and the damper is provided between the internal combustion engine and the power split mechanism.

15. The misfire detection method according to claim 10, wherein the transmission mechanism includes an automatic transmission with a lock-up clutch, in addition to the damper.

16. The misfire detection method according to claim 10, wherein the transmission mechanism includes a manual transmission with a clutch mechanism, in addition to the damper.

17. The misfire detection method according to claim 10, wherein in determining whether a misfire occurs, it is determined whether a tentative determination condition is satisfied;

the tentative determination condition is a condition that an amount of variation of the rotational speed of the output shaft during the time period from the compression top dead center in the first cylinder to the compression top dead center in the second cylinder is equal to or larger than a threshold value; and if the tentative determination condition is satisfied, it is determined whether the first condition and the second condition are satisfied.

18. The misfire detection method according to claim 17, wherein in determining whether a misfire occurs, it is determined whether a misfire detection start condition is satisfied;

the misfire detection start condition is a condition that the current rotational speed of the output shaft and a current engine load factor are in a predetermined operation region;

if the misfire detection start condition is satisfied, it is determined whether the tentative determination condition is satisfied; and the predetermined operation region is set to an operation region where a lower limit value of the engine load factor increases as the rotational speed of the output shaft increases.

* * * * *